US012698594B2

(12) United States Patent
Wang et al.

(10) Patent No.: US 12,698,594 B2
(45) Date of Patent: Aug. 4, 2026

(54) FIBROUS STRUCTURES

(71) Applicant: The Procter & Gamble Company, Cincinnati, OH (US)

(72) Inventors: Fei Wang, Mason, OH (US); Douglas Jay Barkey, Salem Township, OH (US); James Allen Cain, Albany, NY (US); Stephen John DelVecchio, Cincinnati, OH (US); Angela Marie Leimbach, Hamilton, OH (US); Kun Piao, Deerfield Township, OH (US); James Kenneth Comer, West Chester, OH (US); Ryan Dominic Maladen, Anderson Township, OH (US)

(73) Assignee: The Procter & Gamble Company, Cincinnati, OH (US)

(*) Notice: Subject to any disclaimer, the term of this patent is extended or adjusted under 35 U.S.C. 154(b) by 187 days.

(21) Appl. No.: 18/614,851

(22) Filed: Mar. 25, 2024

(65) Prior Publication Data

US 2024/0229357 A1 Jul. 11, 2024

Related U.S. Application Data

(63) Continuation of application No. 17/521,174, filed on Nov. 8, 2021, now Pat. No. 11,970,818, which is a (Continued)

(51) Int. Cl.

*D21F 11/00* (2006.01)
*D21F 1/10* (2006.01)

(Continued)

(52) U.S. Cl.

CPC .............. *D21F 11/006* (2013.01); *D21F 1/10* (2013.01); *D21F 3/045* (2013.01); *D21F 5/048* (2013.01);

(Continued)

(58) Field of Classification Search

CPC .......... D21F 11/006; D21F 1/10; D21F 3/045; D21F 5/048; D21F 5/181; D21F 5/188;

(Continued)

(56) References Cited

U.S. PATENT DOCUMENTS 2,742,823 A 4/1956 Compton
2,834,828 A 5/1958 Ebel (Continued)

FOREIGN PATENT DOCUMENTS

CA 2567189 A1 12/2005
DE 102006032233 A1 1/2008

(Continued)

OTHER PUBLICATIONS

14566M PCT Search Report and Written Opinion for PCT/US2017/058173 dated Jan. 19, 2018, 17 pages.

(Continued)

*Primary Examiner* — Abbas Rashid
*Assistant Examiner* — Stephen M Russell
(74) *Attorney, Agent, or Firm* — Richard L. Alexander

(57) ABSTRACT

A fibrous structure. The structure may include a plurality of continuous or semi-continuous knuckles extending from portions of the surface of the fibrous structure in a parallel path, wherein the plurality of knuckles may be separated by adjacent continuous or semi-continuous pillows. Each knuckle may comprise a plurality of discrete pillows, the plurality of discrete pillows may be arranged in a spaced configuration along the path of each knuckle; alternatively, each pillow may comprise a plurality of discrete knuckles, the plurality of discrete knuckles may be arranged in a spaced configuration along the path of each pillow.

24 Claims, 12 Drawing Sheets

Related U.S. Application Data continuation of application No. 15/792,811, filed on Oct. 25, 2017, now Pat. No. 11,198,972.

(60) Provisional application No. 62/412,455, filed on Oct. 25, 2016.

(51) Int. Cl.

| | |
|---|---|
| ***D21F 3/04*** | (2006.01) |
| ***D21F 5/04*** | (2006.01) |
| ***D21F 5/18*** | (2006.01) |
| ***D21F 9/02*** | (2006.01) |
| ***D21H 25/00*** | (2006.01) |
| ***D21H 27/00*** | (2006.01) |
| ***D21H 27/02*** | (2006.01) |
| *B31F 1/12* | (2006.01) |
| *D21G 3/00* | (2006.01) |

(52) U.S. Cl.

CPC ................ *D21F 5/181* (2013.01); *D21F 9/02* (2013.01); *D21H 25/005* (2013.01); *D21H 27/002* (2013.01); *D21H 27/004* (2013.01); *D21H 27/005* (2013.01); *D21H 27/008* (2013.01); *D21H 27/02* (2013.01); *B31F 1/126* (2013.01); *D21F 5/188* (2013.01); *D21G 3/005* (2013.01)

(58) Field of Classification Search

CPC .. D21H 25/005; D21H 27/002; D21H 27/004; D21H 27/005; D21H 27/008; D21H 27/02; B31F 1/126; D21G 3/005

See application file for complete search history.

(56) References Cited

U.S. PATENT DOCUMENTS

| | | | |
|---|---|---|---|
| 2,946,725 | A | 7/1960 | Norris |
| 3,070,510 | A | 12/1962 | Cooley |
| 3,111,127 | A | 11/1963 | Jarboe |
| 3,535,421 | A | 10/1970 | Briner |
| 3,538,230 | A | 11/1970 | Pader |
| 3,678,154 | A | 7/1972 | Widder |
| 3,862,307 | A | 1/1975 | Di |
| 3,917,613 | A | 11/1975 | Humbert et al. |
| 3,991,178 | A | 11/1976 | Humbert et al. |
| 4,029,759 | A | 6/1977 | Humbert et al. |
| 4,051,234 | A | 9/1977 | Gieske |
| 4,070,496 | A | 1/1978 | Rowsell et al. |
| 4,136,163 | A | 1/1979 | Watson |
| 4,150,052 | A | 4/1979 | Watson |
| 4,153,679 | A | 5/1979 | Rowsell |
| 4,157,384 | A | 6/1979 | Browning |
| 4,178,459 | A | 12/1979 | Rowsell |
| 4,206,215 | A | 6/1980 | Bailey |
| 4,230,688 | A | 10/1980 | Rowsell |
| 4,340,583 | A | 7/1982 | Wason |
| 4,459,425 | A | 7/1984 | Amano |
| 4,514,345 | A | 4/1985 | Johnson et al. |
| 4,966,754 | A | 10/1990 | Purohit et al. |
| 5,004,597 | A | 4/1991 | Majeti |
| 5,180,577 | A | 1/1993 | Polefka |
| 5,266,592 | A | 11/1993 | Grub et al. |
| 5,281,410 | A | 1/1994 | Lukacovic |
| 5,322,689 | A | 6/1994 | Hughes et al. |
| 5,328,565 | A | 7/1994 | Rasch et al. |
| 5,399,412 | A | 3/1995 | Sudall et al. |
| 5,451,404 | A | 9/1995 | Furman |
| 5,503,715 | A | 4/1996 | Trokhan et al. |
| 5,578,293 | A | 11/1996 | Prencipe |
| 5,589,160 | A | 12/1996 | Rice |
| 5,603,920 | A | 2/1997 | Rice |
| 5,608,119 | A | 3/1997 | Amano et al. |
| 5,628,876 | A | 5/1997 | Ayers et al. |
| 5,637,194 | A | 6/1997 | Ampulski et al. |
| 5,651,958 | A | 7/1997 | Rice |
| 5,658,553 | A | 8/1997 | Rice |
| 5,703,123 | A | 12/1997 | Pelzer et al. |
| 5,714,041 | A | 2/1998 | Ayers et al. |
| 5,716,601 | A | 2/1998 | Rice |
| 5,725,865 | A | 3/1998 | Mane et al. |
| 5,843,466 | A | 12/1998 | Mane et al. |
| 5,904,811 | A | 5/1999 | Ampulski et al. |
| 5,977,166 | A | 11/1999 | Greenberg |
| 6,117,270 | A | 9/2000 | Trokhan |
| 6,193,847 | B1 | 2/2001 | Trokhan |
| 6,197,288 | B1 | 3/2001 | Mankoo |
| 6,335,180 | B1 | 1/2002 | Julius et al. |
| 6,365,215 | B1 | 4/2002 | Grainger et al. |
| 6,451,844 | B1 | 9/2002 | Watkins et al. |
| 6,464,831 | B1 | 10/2002 | Trokhan et al. |
| 6,592,884 | B2 | 7/2003 | Hofmann et al. |
| 6,660,129 | B1 | 12/2003 | Cabell et al. |
| 6,673,844 | B2 | 1/2004 | Kumamoto et al. |
| 6,790,629 | B2 | 9/2004 | Julius et al. |
| 6,867,009 | B2 | 3/2005 | Cortright et al. |
| 6,884,903 | B2 | 4/2005 | Lorenz et al. |
| 6,890,567 | B2 | 5/2005 | Nakatsu et al. |
| 6,956,139 | B2 | 10/2005 | Green et al. |
| 7,094,320 | B1 | 8/2006 | Phan |
| 7,097,991 | B2 | 8/2006 | Julius et al. |
| 7,128,809 | B2 | 10/2006 | Vinson et al. |
| 7,132,000 | B2 | 11/2006 | Muerner et al. |
| 7,166,195 | B2 | 1/2007 | Hawes |
| 7,186,803 | B2 | 3/2007 | Dubin et al. |
| 7,189,760 | B2 | 3/2007 | Erman et al. |
| 7,465,581 | B2 | 12/2008 | Bevan et al. |
| 7,691,229 | B2 | 4/2010 | Vinson et al. |
| 7,914,649 | B2 | 3/2011 | Ostendorf et al. |
| 7,915,207 | B2 | 3/2011 | Herdt et al. |
| 7,919,624 | B2 | 4/2011 | Baraldi et al. |
| D672,966 | S | 12/2012 | Sheehan et al. |
| 8,461,145 | B2 | 6/2013 | Gijsen et al. |
| 8,506,759 | B2 | 8/2013 | Spitzer et al. |
| 8,569,505 | B2 | 10/2013 | Codd et al. |
| 8,592,621 | B2 | 11/2013 | Ley et al. |
| 9,044,429 | B2 | 6/2015 | Bakes et al. |
| 9,340,914 | B2 | 5/2016 | Manifold et al. |
| 9,427,415 | B2 | 8/2016 | Sreekrishna et al. |
| 9,937,115 | B2 | 4/2018 | Haught et al. |
| 10,538,881 | B2 | 1/2020 | Wang et al. |
| 10,745,864 | B2 | 8/2020 | Wang |
| 10,745,865 | B2 | 8/2020 | Wang et al. |
| 11,162,224 | B2 | 11/2021 | Wang et al. |
| 11,486,097 | B2 | 11/2022 | Wang |
| 11,970,818 | B2 | 4/2024 | Wang |
| 2002/0119231 | A1 | 8/2002 | Kumamoto et al. |
| 2003/0044573 | A1 | 3/2003 | Rasch et al. |
| 2003/0203196 | A1 | 10/2003 | Trokhan |
| 2004/0052735 | A1 | 3/2004 | Nakatsu et al. |
| 2004/0084167 | A1 | 5/2004 | Vinson et al. |
| 2004/0187226 | A1 | 9/2004 | Muerner et al. |
| 2005/0238701 | A1 | 10/2005 | Kleinwaechter |
| 2005/0245407 | A1 | 11/2005 | Ishihara |
| 2005/0266435 | A1 | 12/2005 | Hackos et al. |
| 2006/0013837 | A1 | 1/2006 | Haines |
| 2006/0029628 | A1 | 2/2006 | Kleinwaechter |
| 2006/0083899 | A1 * | 4/2006 | Burazin ............... D21H 27/002 428/174 |
| 2006/0088697 | A1 | 4/2006 | Manifold et al. |
| 2006/0154886 | A1 | 7/2006 | Weihe et al. |
| 2006/0204466 | A1 | 9/2006 | Littau et al. |
| 2007/0036733 | A1 | 2/2007 | Spence et al. |
| 2007/0137812 | A1 | 6/2007 | Shannon et al. |
| 2007/0190090 | A1 | 8/2007 | Brown |
| 2007/0297993 | A1 | 12/2007 | Kindel et al. |
| 2008/0153845 | A1 | 6/2008 | Palmer et al. |
| 2008/0175801 | A1 | 7/2008 | Ramji |
| 2008/0245498 | A1 | 10/2008 | Ostendorf et al. |
| 2008/0311054 | A1 | 12/2008 | Natsch |
| 2009/0081153 | A1 | 3/2009 | Scott et al. |
| 2009/0098213 | A1 | 4/2009 | Tran |
| 2009/0131302 | A1 | 5/2009 | Pasricha et al. |

(56) References Cited

U.S. PATENT DOCUMENTS

2009/0175882 A1 7/2009 Patapoutian et al.
2010/0119779 A1 5/2010 Ostendorf et al.
2010/0183524 A1 7/2010 Zielinski et al.
2010/0278991 A1 11/2010 Haught et al.
2010/0297400 A1 11/2010 Mellin et al.
2010/0314059 A1 12/2010 Edwards et al.
2010/0316615 A1 12/2010 Kurreck et al.
2011/0077275 A1 3/2011 Zielinski et al.
2011/0104301 A1 5/2011 Ahern et al.
2011/0124666 A1 5/2011 Gijsen et al.
2011/0178181 A1 7/2011 Bakes et al.
2011/0189451 A1* 8/2011 Manifold ............. D21H 27/002 428/219
2011/0311345 A1 12/2011 Mcneil
2012/0082628 A1 4/2012 Haught
2012/0088774 A1 4/2012 Grahek et al.
2012/0121737 A1 5/2012 Vielhaber et al.
2013/0143001 A1 6/2013 Manifold et al.
2013/0315843 A1 11/2013 Haught et al.
2013/0319625 A1 12/2013 Mohammadi et al.
2014/0050675 A1 2/2014 Zielinski et al.
2015/0176216 A1 6/2015 Ostendorf et al.
2015/0176218 A1 6/2015 Maladen et al.
2015/0176220 A1 6/2015 Ostendorf et al.
2015/0225903 A1 8/2015 Jeannot et al.
2015/0272907 A1 10/2015 Sreekrishna et al.
2015/0308050 A1* 10/2015 Corbett ................... B29B 11/14 162/218
2015/0330030 A1 11/2015 Dwiggins
2015/0352801 A1 12/2015 Margo Moreno
2016/0090692 A1 3/2016 Eagles et al.
2016/0090693 A1 3/2016 Eagles et al.
2016/0090698 A1 3/2016 Sze et al.
2016/0145809 A1 5/2016 Hermans et al.
2016/0145811 A1* 5/2016 Socci ........................ D21J 3/10 162/217
2016/0158136 A1 6/2016 Haught et al.
2016/0331659 A1 11/2016 Sreekrishna et al.
2018/0112357 A1 4/2018 Wang et al.
2018/0112358 A1 4/2018 Wang et al.
2018/0112361 A1 4/2018 Wang et al.
2018/0280562 A1 10/2018 Salaam-zayid et al.
2020/0109520 A1 4/2020 Wang et al.
2020/0354896 A1 11/2020 Wang et al.
2021/0078284 A1* 3/2021 Martin ...................... D21F 7/12
2022/0064866 A1 3/2022 Wang et al.
2023/0027102 A1 1/2023 Wang et al.

FOREIGN PATENT DOCUMENTS

EP 310299 A1 4/1989
EP 1217106 A1 6/2002
EP 1600151 B1 8/2008
JP 2006065044 A 3/2006
JP 2011136953 A 7/2011
JP 2011205975 A 10/2011
JP 2012062304 A 3/2012
JP 2012080840 A 4/2012
WO 0135768 A1 5/2001
WO 2004043169 A1 5/2004
WO 2005049553 A1 6/2005
WO 2006103401 A2 10/2006
WO 2009087242 A2 7/2009
WO 2011019342 A2 2/2011
WO 2011034868 A1 3/2011
WO 2013176897 A2 11/2013
WO 2018081192 A1 5/2018

OTHER PUBLICATIONS

All Office Actions, U.S. Appl. No. 15/792,811, filed Oct. 25, 2017.
All Office Actions; U.S. Appl. No. 15/792,816, filed Oct. 25, 2017.
All Office Actions; U.S. Appl. No. 15/792,821, filed Oct. 25, 2017.
All Office Actions; U.S. Appl. No. 16/707,256; filed Dec. 9, 2019.
All Office Actions; U.S. Appl. No. 16/938,123; filed Jul. 24, 2020.
All Office Actions; U.S. Appl. No. 17/521,174, filed Nov. 8, 2021.
All Office Actions; U.S. Appl. No. 17/936,535, filed Sep. 29, 2022.
All Office Actions; U.S. Appl. No. 15/792,824, filed Oct. 25, 2017.
All Office Actions; U.S. Appl. No. 17/500,628, filed Oct. 13, 2021.

* cited by examiner

FIBROUS STRUCTURES

CROSS REFERENCE TO RELATED APPLICATIONS

This application is a continuation of, and claims priority under 35 U.S.C. § 120 to, U.S. patent application Ser. No. 17/521,174, filed on Nov. 8, 2021, which is a continuation of U.S. patent application Ser. No. 15/792,811, filed on Oct. 25, 2017, now granted U.S. Pat. No. 11,198,972, issued Dec. 14, 2001, which claims the benefit, under 35 USC § 119(e), of U.S. Provisional Patent Application Ser. No. 62/412,455, filed on Oct. 25, 2016, the entire disclosures of which are fully incorporated by reference herein.

FIELD

The present disclosure generally relates to fibrous structures and, more particularly, relates to structurally rugged fibrous structures.

BACKGROUND

Fibrous structures, such as sanitary tissue products, for example, are useful in many ways in everyday life. These products can be used as wiping implements for post-urinary and post-bowel movement cleaning (toilet tissue and wet wipes), for otorhinolaryngological discharges (facial tissue), and multi-functional absorbent and cleaning uses (paper towels).

Retail consumers fibrous structures such as paper towels and bath tissue look for certain properties, including softness, strength, and absorbency, for example. Such properties can be supplied in a fibrous structure by the selection of the material components of the fibrous structure and the manufacturing equipment and processes used to make it.

The existing art can be improved, and the consumer-desired results can be achieved, by new fibrous structures that deliver both superior performance properties and consumer-desirable aesthetic properties.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Figure 1:
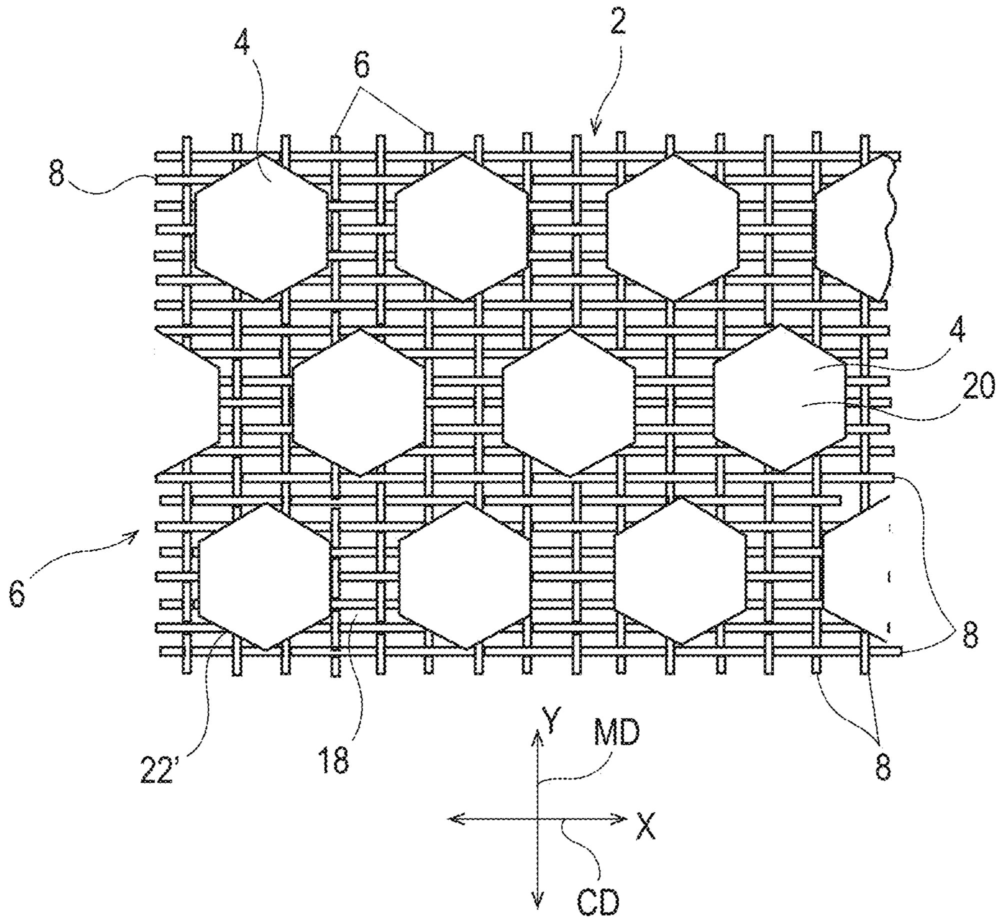
Fig. 1 PRIOR ART
FIG. 1 is a representative papermaking belt of the kind useful as a papermaking belt used in the present invention.

Various non-limiting embodiments of the present disclosure will now be described to provide an overall understanding of the principles of the structure, function, manufacture, and use of the fibrous structures disclosed herein. One or more examples of these non-limiting embodiments are illustrated in the accompanying drawings. Those of ordinary skill in the art will understand that the fibrous structures described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

Fibrous structures such as paper towels, bath tissues and facial tissues are typically made in a "wet laying" process in which a slurry of fibers, usually wood pulp fibers, is deposited onto a forming wire and/or one or more papermaking belts such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished product (e.g., a sanitary tissue product) by ply-bonding and embossing, for example. In general, the finished product can be converted "wire side out" or "fabric side out" which refers to the orientation of the sanitary tissue product during manufacture. That is, during manufacture, one side of the fibrous structure faces the forming wire, and the other side faces the papermaking belt, such as the papermaking belt disclosed herein.

The wet-laying process can be designed such that the finished fibrous structure has visually distinct features produced in the wet-laying process. Any of the various forming wires and papermaking belts utilized can be designed to leave a physical, three-dimensional impression in the finished paper. Such three-dimensional impressions are well known in the art, particularly in the art of "through air drying" (TAD) processes, with such impressions often being referred to a "knuckles" and "pillows." Knuckles are typically relatively high density regions corresponding to the "knuckles" of a papermaking belt, i.e., the filaments or resinous structures that are raised at a higher elevation than other portions of the belt. Likewise, "pillows" are typically relatively low density regions formed in the finished fibrous structure at the relatively uncompressed regions between or around knuckles. Further, the knuckles and pillows in a fibrous structure can exhibit a range of densities relative to one another.

Thus, in the description below, the term "knuckles" or "knuckle region," or the like can be used for either the raised portions of a papermaking belt or the densified portions formed in the paper made on the papermaking belt, and the meaning should be clear from the context of the description herein. Likewise "pillow" or "pillow region" or the like can be used for either the portion of the papermaking belt between, within, or around knuckles (also referred to in the art as "deflection conduits" or "pockets"), or the relatively uncompressed regions between, within, or around knuckles in the paper made on the papermaking belt, and the meaning should be clear from the context of the description herein. In general, knuckles or pillows can each be either continuous, semi-continuous or discrete, as described herein.

Knuckles and pillows in paper towels and bath tissue can be visible to the retail consumer of such products. The knuckles and pillows can be imparted to a fibrous structure from a papermaking belt in various stages of production, i.e., at various consistencies and at various unit operations during the drying process, and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured polymer on a woven reinforcing member, of which the present invention is an improvement. But further, the present improvement can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present invention can provide the relatively large recessed pockets and sufficient knuckle dimensions to redistribute the fiber upon high impact creping in a creping nip between a backing roll and the fabric to form additional bulk in conventional wet press processes. Likewise, when utilized as a belt in a belt crepe method, a papermaking belt of the present invention can provide the fiber enriched dome regions arranged in a repeating pattern corresponding to the pattern of the papermaking belt, as well as the interconnected plurality of surround areas to form additional bulk and local basis weight distribution in a conventional wet press process.

An example of a papermaking belt structure of the type useful in the present invention and made according to the disclosure of U.S. Pat. No. 4,514,345 is shown in FIG. 1. As shown, the papermaking belt 2 can include cured resin elements 4 forming knuckles 20 on a woven reinforcing member 6. The reinforcing member 6 can be made of woven filaments 8 as is known in the art of papermaking belts, including resin coated papermaking belts. The papermaking belt structure shown in FIG. 1 includes discrete knuckles 20 and a continuous deflection conduit, or pillow region 18. The discrete knuckles 20 can form densified knuckles 20' in the fibrous structure made thereon; and, likewise, the continuous deflection conduit, i.e., pillow region 18, can form a continuous pillow region 18' in the fibrous structure made thereon. The knuckles can be arranged in a pattern described with reference to an X-Y plane, and the distance between knuckles 20 in at least one of X or Y directions can vary according to the present invention disclosed herein. In general, the X-Y plane also corresponds to the machine direction, MD, and cross machine direction, CD, of a papermaking belt.

A second way to provide visually perceptible features to a fibrous structure like a paper towel or bath tissue is embossing. Embossing is a well known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements in the fibrous structure while leaving uncompressed, or substantially uncompressed, relatively low density continuous or substantially continuous network at least partially defining or surrounding the relatively high density discrete elements.

Embossed features in paper towels and bath tissues can be visible to the retail consumer of such products. As a result, the visual pattern generated by the pattern of knuckles and pillows can be designed to be visually appealing. Such patterns are well known in the art, and can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014.

In an embodiment, a fibrous structure of the present invention has a pattern of knuckles and pillows imparted to it by a papermaking belt having a corresponding pattern of knuckles and pillows that provides for superior product performance and can be visually appealing to a retail consumer.

In an embodiment, a fibrous structure of the present invention has a pattern of knuckles and pillows imparted to it by a papermaking belt having a corresponding pattern of knuckles and an emboss pattern, which together with the knuckles and pillows provides for an overall visual appearance that is appealing to a retail consumer.

In an embodiment, a fibrous structure of the present invention has a pattern of knuckles and pillows imparted to it by a papermaking belt having a corresponding pattern of knuckles, an emboss pattern, which together with the knuckles and pillows provides for an overall visual appearance that is appealing to a retail consumer, and exhibits superior product performance over known fibrous structures.

"Fibrous structure" as used herein means a structure that comprises one or more fibers. Paper is a fibrous structure. Nonlimiting examples of processes for making fibrous structures include known wet-laid papermaking processes and air-laid papermaking processes, and embossing and printing processes. Such processes typically comprise the steps of preparing a fiber composition in the form of a suspension in a medium, either wet, more specifically aqueous medium, or dry, more specifically gaseous (i.e., with air as medium). The aqueous medium used for wet-laid processes is oftentimes referred to as a fiber slurry. The fibrous suspension is then used to deposit a plurality of fibers onto a forming wire or papermaking belt such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished paper product (e.g., a sanitary tissue product).

The fibrous structures of the present disclosure can exhibit a basis weight of greater than about 15 g/m$^2$ (9.2 lbs/3000 ft$^2$) to about 120 g/m$^2$ (73.8 lbs/3000 ft$^2$), alternatively from about 15 g/m$^2$ (9.2 lbs/3000 ft$^2$) to about 110 g/m$^2$ (67.7 lbs/3000 ft$^2$), alternatively from about 20 g/m$^2$ (12.3 lbs/3000 ft$^2$) to about 100 g/m$^2$ (61.5 lbs/3000 ft$^2$), and alternatively from about 30 g/m$^2$ (18.5 lbs/3000 ft$^2$) to about 90 g/m$^2$ (55.4 lbs/3000 ft$^2$). In addition, the sanitary tissue products and/or the fibrous structures of the present disclosure can exhibit a basis weight between about 40 g/m (24.6 lbs/3000 ft$^2$) to about 120 g/m$^2$ (73.8 lbs/3000 ft$^2$), alternatively from about 50 g/m$^2$ (30.8 lbs/3000 ft$^2$) to about 110 g/m$^2$ (67.7 lbs/3000 ft$^2$), alternatively from about 55 g/m$^2$ (33.8 lbs/3000 ft$^2$) to about 105 g/m$^2$ (64.6 lbs/3000 ft$^2$), and alternatively from about 60 g/m$^2$ (36.9 lbs/3000 ft$^2$) to about 100 g/m$^2$ (61.5 lbs/3000 ft$^2$).

The fibrous structures of the present disclosure can be in the form of sanitary tissue product, including rolled sanitary tissue product. Sanitary tissue product rolls can comprise a plurality of connected, but perforated sheets of one or more fibrous structures, that are separably dispensable from adjacent sheets, such as is known for paper towels and bath tissue, which are both considered sanitary tissue products in roll form. Bath tissue, also referred to as toilet paper, can be generally distinguished from paper towels by the absence of permanent wet strength chemistry. Bath tissue can have temporary wet strength chemistry applied thereto.

The fibrous structures of the present disclosure can comprises additives such as softening agents, temporary wet strength agents (i.e. FennoRez glyozalated polyacrylamide), permanent wet strength agents, bulk softening agents, lotions, silicones, wetting agents, latexes, especially surface-pattern-applied latexes, dry strength agents such as KYMENE® wet strength additive, polyamido-amine-epichlorhydrin (PAE), carboxymethylcellulose and starch, and other types of additives suitable for inclusion in and/or on sanitary tissue products and/or fibrous structures.

"Machine Direction" or "MD" as used herein means the direction on a web corresponding to the direction parallel to the flow of a fibrous web or fibrous structure through a fibrous structure making machine.

"Cross Machine Direction" or "CD" as used herein means a direction perpendicular to the Machine Direction in the plane of the web.

"Relatively low density" as used herein means a portion of a fibrous structure having a density that is lower than a relatively high density portion of the fibrous structure.

"Relatively high density" as used herein means a portion of a fibrous structure having a density that is higher than a relatively low density portion of the fibrous structure.

"Substantially semi-continuous" or "semi-continuous" region refers an area on a sheet of sanitary tissue product which has "continuity" in at least one direction parallel to the first plane, but not all directions, and in which area one can connect any two points by an uninterrupted line running entirely within that area throughout the line's length. Semi-continuous knuckles, for example, may have continuity only in one direction parallel to the plane of a papermaking belt. Minor deviations from such continuity may be tolerable as long as those deviations do not appreciably affect the performance of the fibrous structure.

"Substantially continuous" or "continuous" region refers to an area within which one can connect any two points by an uninterrupted line running entirely within that area throughout the line's length. That is, the substantially continuous region has a substantial "continuity" in all directions parallel to the plane of a papermaking belt and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Discontinuous" or "discrete" regions or zones refer to areas that are separated from one another areas or zones that are discontinuous in all directions parallel to the first plane.

"Discrete deflection cell" also referred to a "discrete pillow" means a portion of a papermaking belt or fibrous structure defined or surrounded by a substantially continuous knuckle portion.

"Discrete raised portion" means a discrete knuckle, i.e., a portion of a papermaking belt or fibrous structure defined or surrounded by, or at least partially defined or surrounded by, a substantially continuous pillow region.

Fibrous Structures

The fibrous structures of the present disclosure can be single-ply or multi-ply fibrous structures and can comprise cellulosic pulp fibers. Other naturally-occurring and/or non-naturally occurring fibers can also be present in the fibrous structures. In one example, the fibrous structures can be throughdried in a TAD process, thus producing what is referred to as "TAD paper". The fibrous structures can be wet-laid fibrous structures and can be incorporated into single- or multi-ply sanitary tissue products.

The fibrous structures of the invention will be described in the context of bath tissue, and in the context of a papermaking belt comprising cured resin on a woven reinforcing member. However, the invention is not limited to bath tissues and can be utilized in other known processes that impart the knuckles and pillow patterns describe herein, including, for example, the fabric crepe and belt crepe processes described above, modified as described herein to produce the papermaking belts and paper of the invention.

In general, a fibrous structure, e.g., bath tissue, of the invention can be made in a process utilizing a papermaking belt of the type described in reference to FIG. 1. In a method as described in the aforementioned U.S. Pat. No. 4,514,345, UV-curable resin is cured onto a reinforcing member 6 of woven filaments 8 in a pattern dictated by a patterned mask having opaque regions and transparent regions. The transparent regions permit curing radiation to penetrate to cure the resin to form knuckles 20, while the opaque regions prevent the curing radiation from curing portions of the resin. Once curing is achieved, the uncured resin is washed away to leave a pattern of cured resin that is substantially identical to the mask pattern. The cured portions are the knuckles 20 of the belt, and the uncured portions are the pillows 18 of the papermaking belt. The pattern of knuckles and pillows can be designed as desired, and the present invention is an improvement in which the pattern of knuckles and pillows disclosed herein delivers a unique papermaking belt that in turn produces sanitary tissue products having superior technical properties compared to prior art sanitary tissue products.

Thus, the mask pattern is replicated in the papermaking belt, which pattern is essentially replicated in the fibrous structure which can be molded onto the papermaking belt when making a fibrous structure. Therefore, in describing the pattern of knuckles and pillows in the fibrous structure of the invention, the pattern of the mask can serve as a proxy, and in the description below a visual description of the mask may be provided, and one is to understand that the dimensions and appearance of the mask is essentially identical to the dimensions and appearance of the papermaking belt made by the mask, and the fibrous structure made on the papermaking belt. Further, in processes that use a papermaking belt not made from a mask, the appearance and structure of the papermaking belt in the same way is imparted to the paper, such that the dimensions of features on the papermaking belt can also be measured and characterized as a proxy for the dimensions and characteristics of the finished paper.

In an effort to improve the product performance properties of, for example, current CHARMIN® bath tissue, the inventors designed a new pattern for the distribution of knuckles and pillows that provides for relatively higher substrate volume that holds up under pressure. It is believed that the increased substrate volume under pressure contributes to better cleaning when used to wipe skin surfaces.

Figure 2:
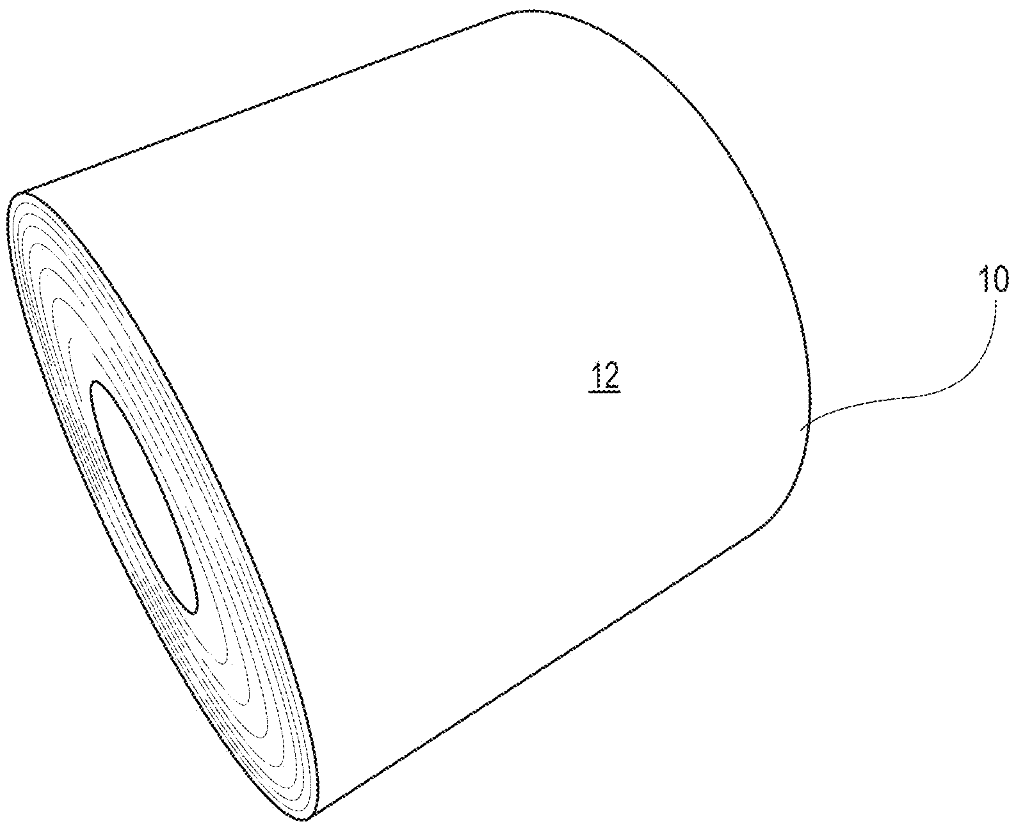
FIG. 2 is a perspective view photograph of a roll of sanitary tissue product of and made by the present invention.
Figure 3:
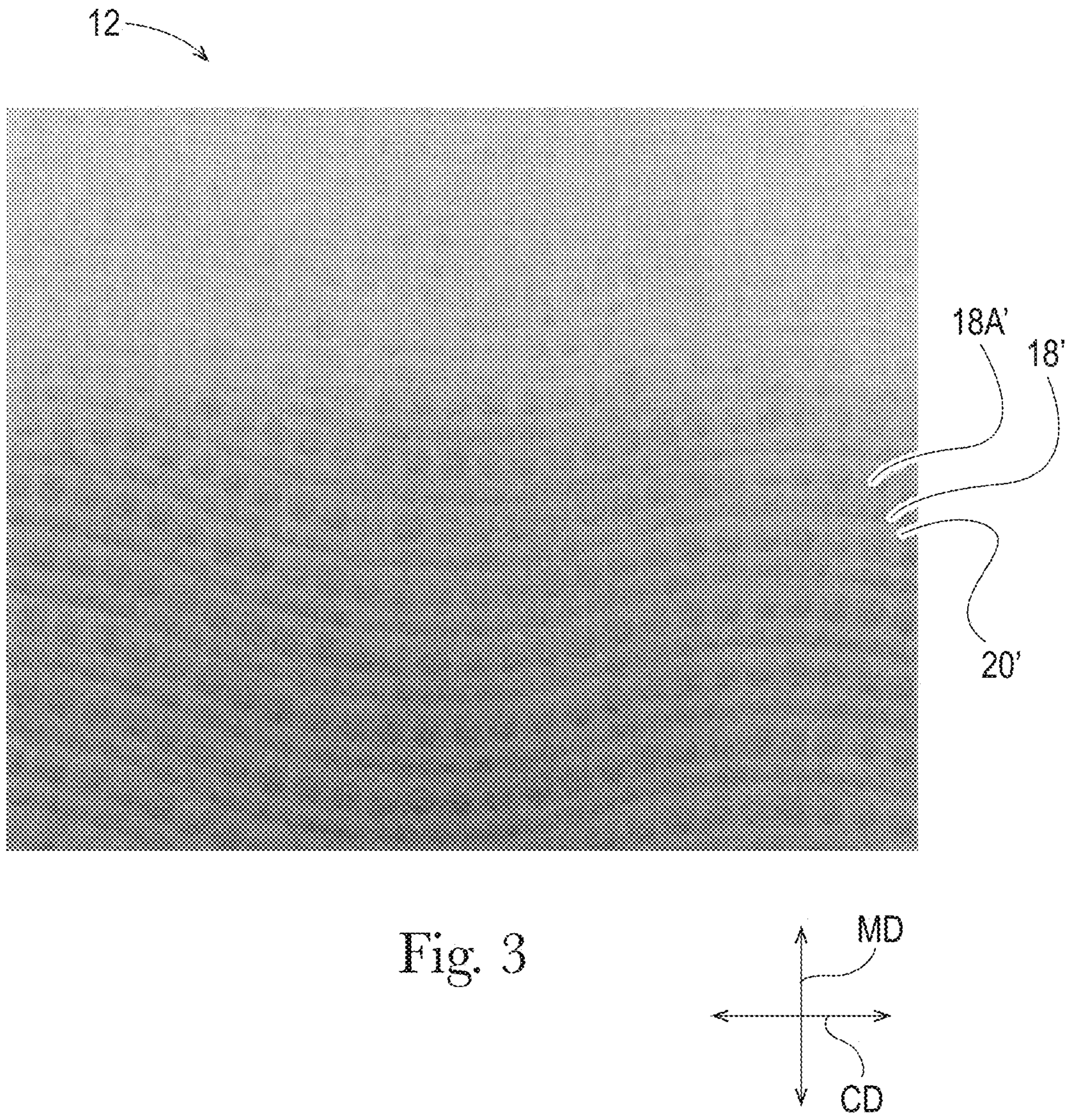
FIG. 3 is a magnified plan view of a portion of the sanitary tissue shown in FIG. 2.

FIG. 2 illustrates a roll 10 of sanitary tissue 12 as an example of the invention. FIG. 3 is a magnified view of the sanitary tissue 12 showing semi-continuous knuckles 20' and semi-continuous pillows 18', as well as discrete pillows 18A'.

Figure 4:
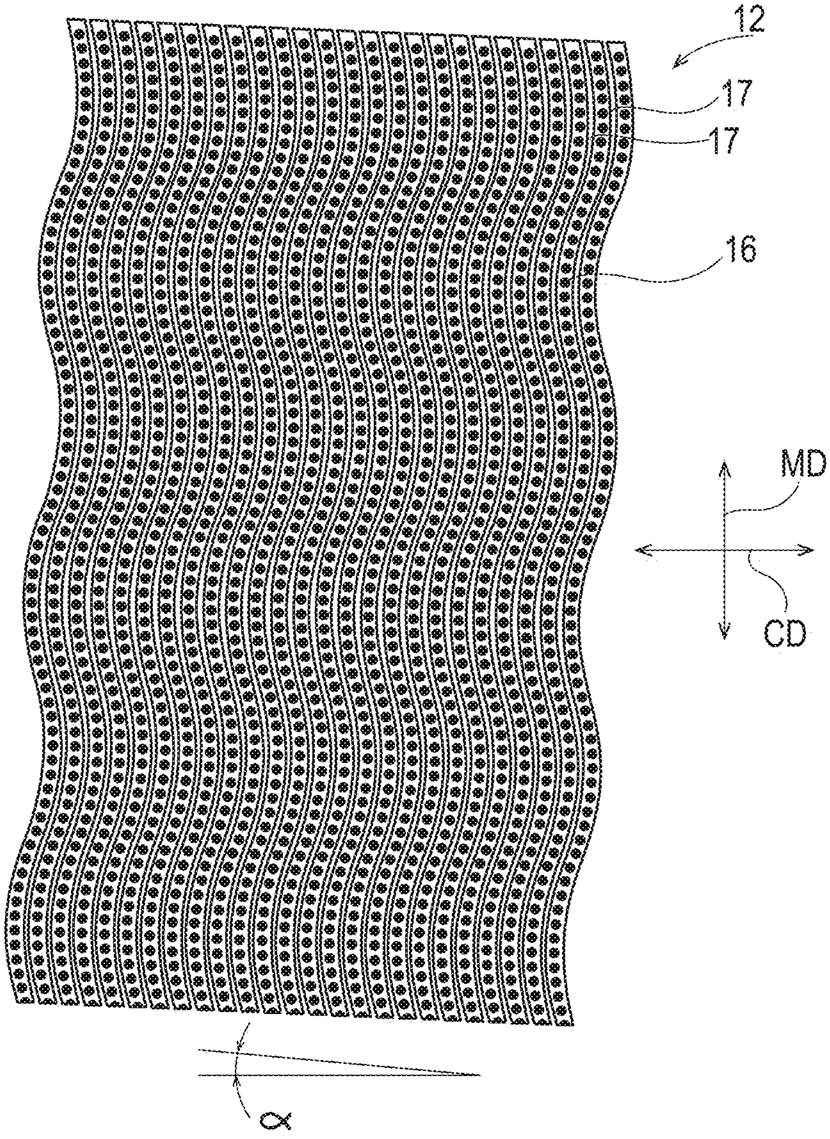
FIG. 4 is a portion of a pattern for a mask used to make a papermaking belt that produced a fibrous structure of the present invention.
Figure 5:
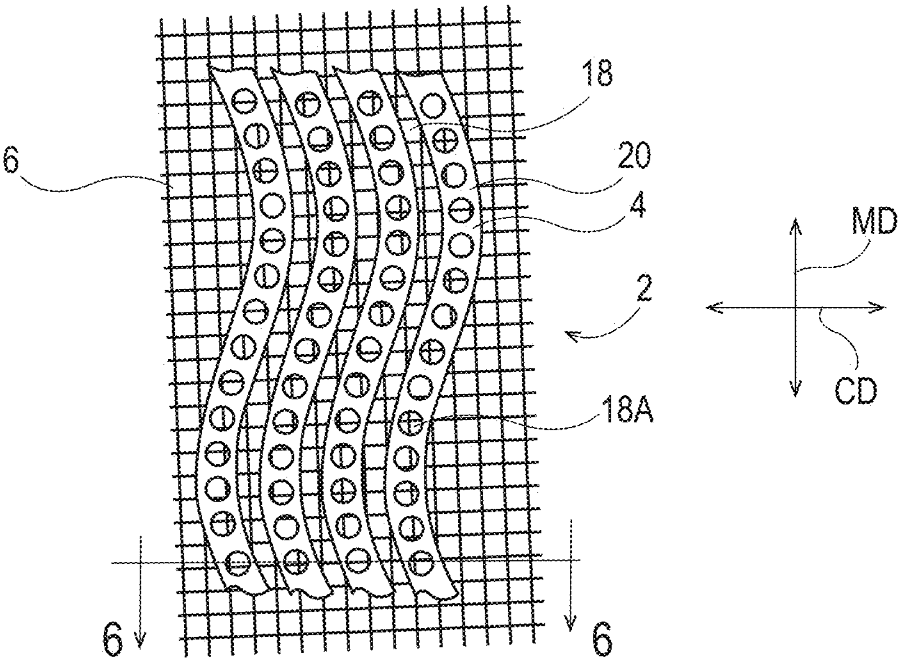
FIG. 5 is a plan view of a portion of a papermaking belt of the present invention that produces a fibrous structure of the present invention.

FIG. 4 shows a portion of the mask 14 used to make the papermaking belt, a portion of which is shown in FIG. 5 that made a sanitary tissue 12 like that shown in FIG. 2. As shown in FIG. 3, the sanitary tissue 12 exhibits a pattern of semi-continuous knuckles 20' which were formed by semi-continuous cured knuckles 20 on the papermaking belt shown in FIG. 5, and which correspond to the white areas 16 of the mask 14 shown in FIG. 4. Any portion of the pattern of FIG. 4 that is white represents a transparent region of the mask 14, which permits UV-light curing of UV-curable resin to form a knuckle 20 on the papermaking belt. Likewise, each knuckle on the papermaking belt forms a knuckle 20' in sanitary tissue 12, which can be a relatively high density region or a region of different basis weight relative to the pillow regions. Any portion of the pattern of FIG. 4 that is black 17 represents an opaque region of the mask, which blocks UV-light curing of the UV-curable resin. The uncured resin is ultimately washed away to form a pillow region 18 on the papermaking belt 2, which can form a relatively low density pillow 20' in the fibrous structure. In the papermaking belt of one example of the invention, both semi-continuous pillows 18 and discrete pillows 18A are formed in the belt, and, consequently, as semi-continuous pillows 18' and discrete pillows 18A' in the sanitary tissue paper 12 made thereon.

In embodiments of fibrous structures made by belts formed by masks that dictate the eventual relative densities of the discrete elements and continuous elements of fibrous structures, such as the one shown in FIG. 3, the relative densities can be inverted such that the fibrous structure has relatively low density areas where relatively high density areas are and, similarly, relatively high density areas where relatively low density areas are. As can be understood by the description herein, the inverse relationship can be achieved by inverting the black and white (or, more generally, the opaque and transparent) portions of the mask used to make the belt that is used to make the fibrous structure. This inverse relation (black/white) can apply to all patterns of the present disclosure, although all fibrous structures/patterns of each category are not illustrated for brevity since the concept is illustrated in FIGS. 2 and 3. The papermaking belts of the present disclosure and the process of making them are described in further detail below.

Figure 7:
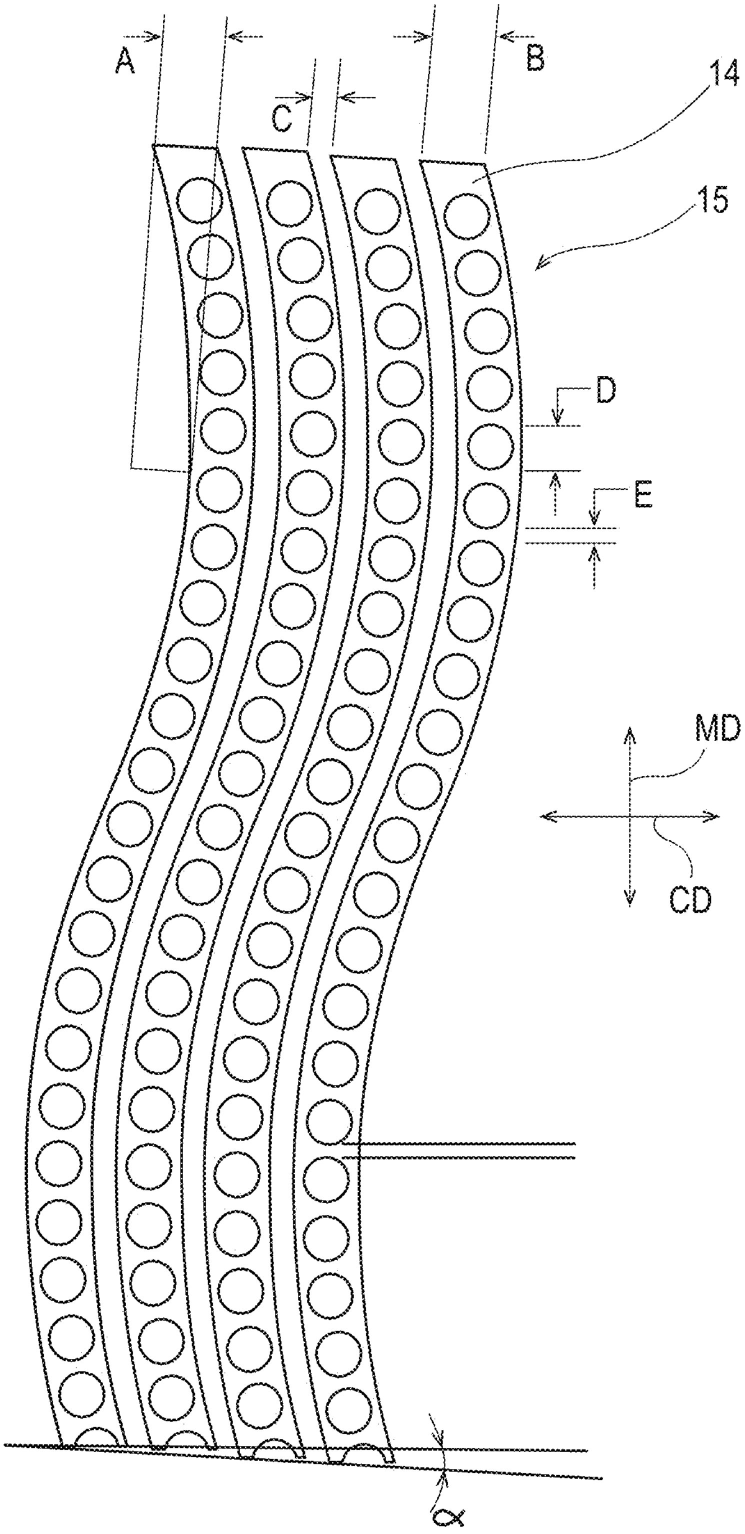
FIG. 7 shows a repeat unit for a pattern for a mask used to make a papermaking belt that produces fibrous structures of the present invention.

FIG. 7 shows a representative repeat unit 15 of a pattern of a mask 14 used to make a papermaking belt having the pattern of knuckles corresponding to a mask that made a sanitary tissue 12 like the one shown in FIG. 2. Again, as discussed above, the sanitary tissue 12 exhibits a pattern of knuckles 20' which were formed by cured resin knuckles 20 on the papermaking belt 2, and which correspond to the white, i.e., transparent, areas 16 of the mask 14 shown in FIG. 4.

A mask 14 as shown can create a papermaking belt 2, and therefore a sanitary tissue product 12, having a plurality of semi-continuous curvilinear knuckles 20' separated by adjacent semi-continuous curvilinear pillows 18' in a generally parallel configuration with the width and spacing of the knuckles 20' and pillows 18' being as determined for desired properties of a sanitary tissue product 12. In addition to the semi-continuous pillows 18', an example of the present invention also includes discrete pillows 18A' formed within the semi-continuous knuckles 20'. Discrete pillows 18A' can be any shape desired and as more fully shown below, but in an example can be circular and spaced in a uniform manner along the length of a given knuckle 20'.

The dimensions of a mask, and therefore the resulting papermaking belt can range according to desired characteristics of the desired paper properties. Using mask 14 as described in FIG. 7 for non-limiting description, the curvilinear aspect can be described as a wave-form having an amplitude A of from about 1.778 mm to about 4.826 mm and can be about 2.286 mm. The width B of semi-continuous knuckles can be uniform and can be from about 1.778 mm to about 2.794 mm and can be about 2.515 mm. The width C of semi-continuous pillows can be uniform and can be from about 0.762 mm to about 2.032 mm and can be about 1.016 mm. The diameter D of discrete pillows, if generally circular shaped, can be from about 0.254 mm to about 3.81 mm and/or from about 0.508 mm to about 3.048 mm and/or from about 0.762 mm to about 2.54 mm and/or from about 1.27 mm to about 2.286 mm and can be about 1.791 mm. The spacing E between discrete pillows can be uniform and can be from about 0.254 mm to about 1.016 mm and can be about 0.4648 mm. The entire pattern can be rotated an angle off of the Machine Direction, MD, by an angle alpha which can be about 2-5 degrees, and can be about 3 degrees.

Figure 8:
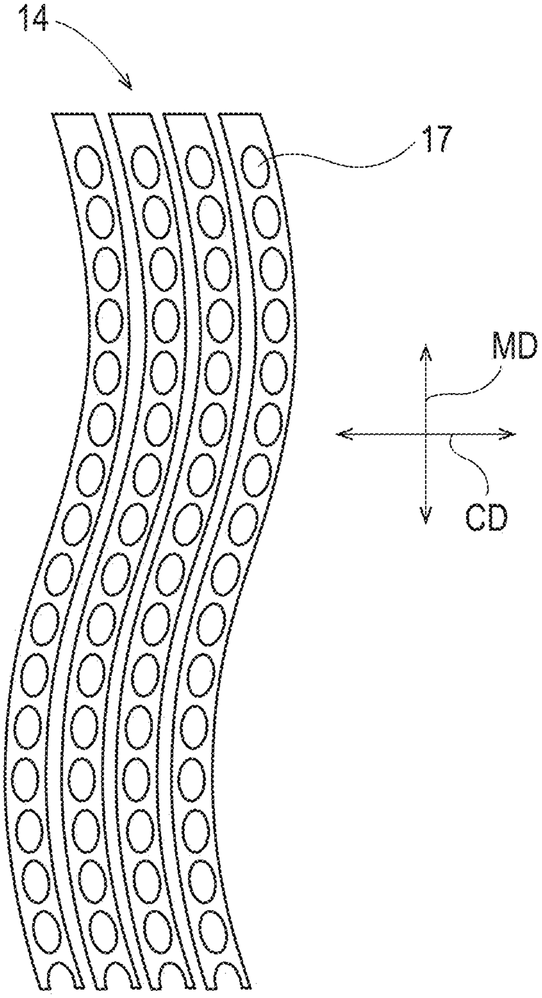
FIG. 8 is a plan view of a portion of a mask showing an alternate pattern for making a papermaking belt of the present invention that produces a fibrous structure of the present invention.

Discrete pillows 18A' can have various shapes, including any shape of a two-dimensional closed figure, with non-limiting examples shown in FIGS. 8-12. In FIG. 8 a mask 14 is shown for making oval or elliptical discrete pillows 18A' that can have a long dimension being between about 1.27 mm and about 2.54 mm and can be about 2.286 mm, and a short dimension of between about 0.889 mm and about 1.651 mm and can be about 1.397 mm. The spacing between elliptical discrete pillows 18A' can be from about 0.508 mm and about 1.016 mm and can be about 0.762 mm.

Figure 9:
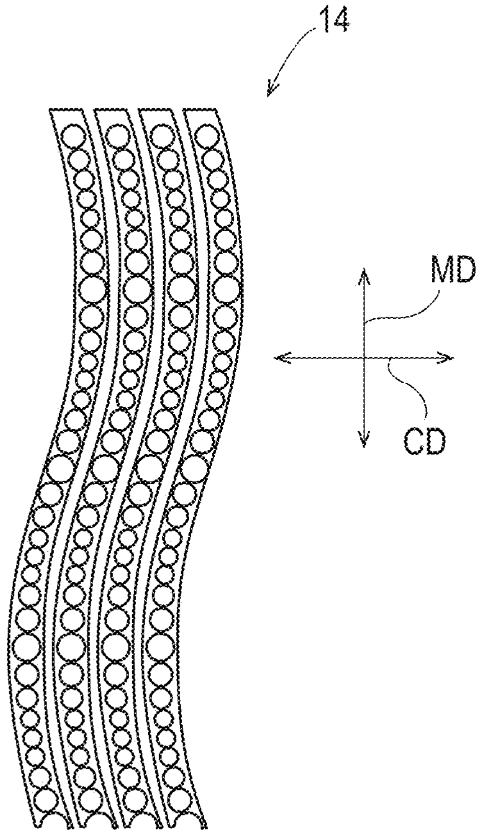
FIG. 9 is a plan view of a portion of a mask showing an alternate pattern for making of a papermaking belt of the present invention that produces a fibrous structure of the present invention.

FIG. 9 shows a mask for making discrete pillows 18A' that are variable in size, in the illustrated case, diameter of a circular shape. In the illustrated example, five different diameter pillows vary in diameter from about 0.762 mm to about 1.778 mm and are generally regularly spaced along semi-continuous knuckle 20.

Figure 10:
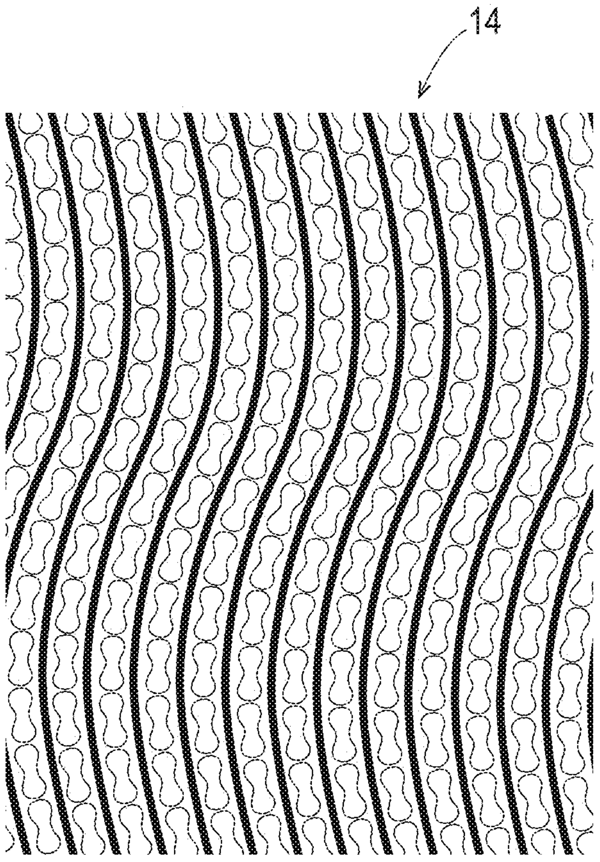
FIG. 10 is a plan view of a portion of a mask showing an alternate pattern for making of a papermaking belt of the present invention that produces a fibrous structure of the present invention.

FIG. 10 shows an example of a mask in which the discrete pillows 22B are in the shape of a dogbone. The dogbone shaped discrete pillows 22B are a non-limiting example of a relatively complex shape that discrete pillows 22B can take.

Figure 11:
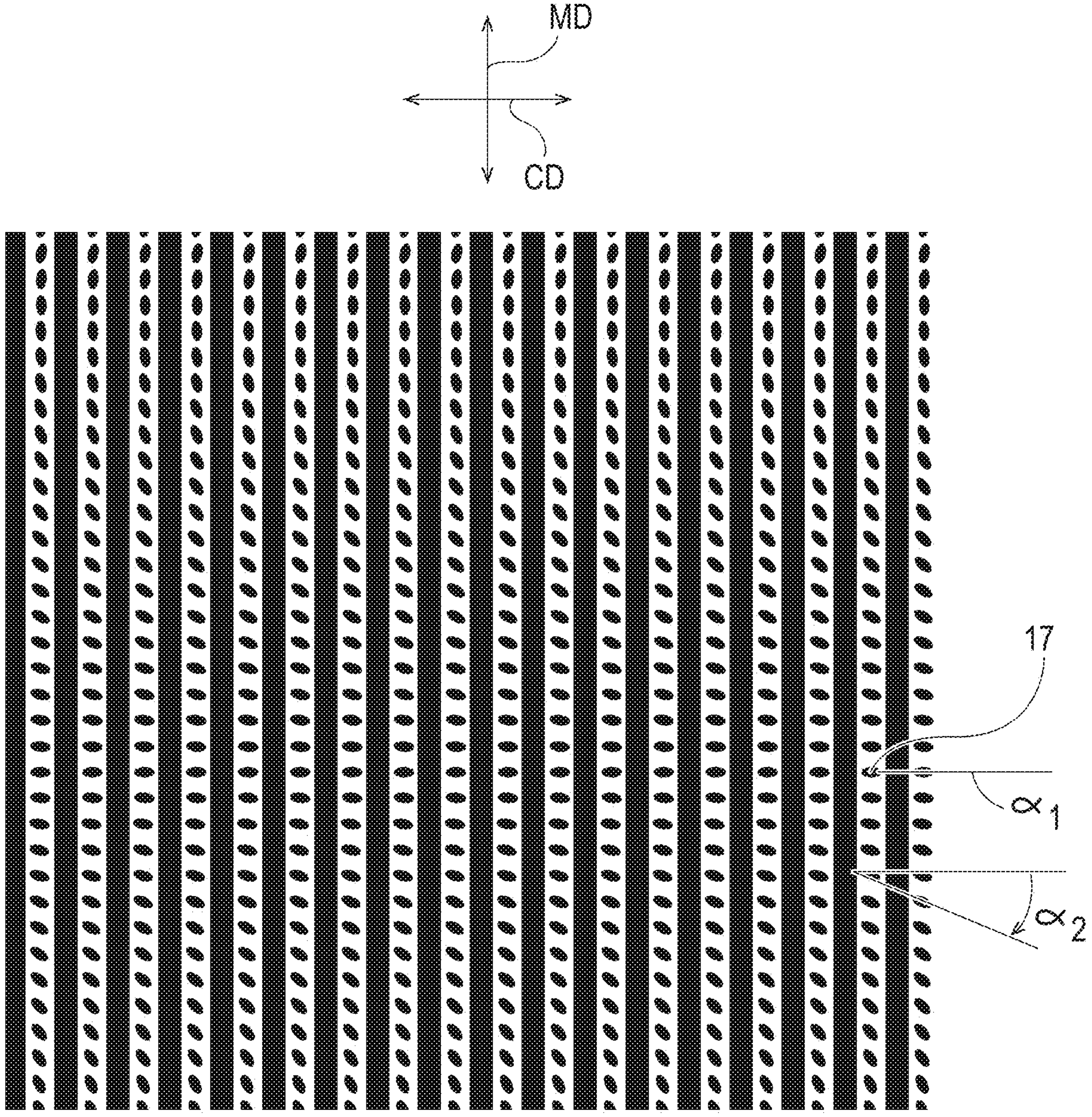
FIG. 11 is a plan view of a portion of a mask showing an alternate pattern for making of a papermaking belt of the present invention that produces a fibrous structure of the present invention.

FIG. 11 shows an example of a mask in the semi-continuous knuckles are generally straight and parallel, and in which the portions corresponding to discrete pillows 22B are in the shape of ellipses, and, as well, the major axis of each ellipse is rotated in the off a CD-direction in a varying amount as the series of ellipses progress in the MD, as illustrated by alpha1 and alpha2 in FIG. 11. In the illustrated embodiment, the rotation from one ellipse to the next is 5 degrees. It is believed that such rotation of discrete pillows contributes to improved visual appearance of a fibrous structure made thereon.

Figure 12:
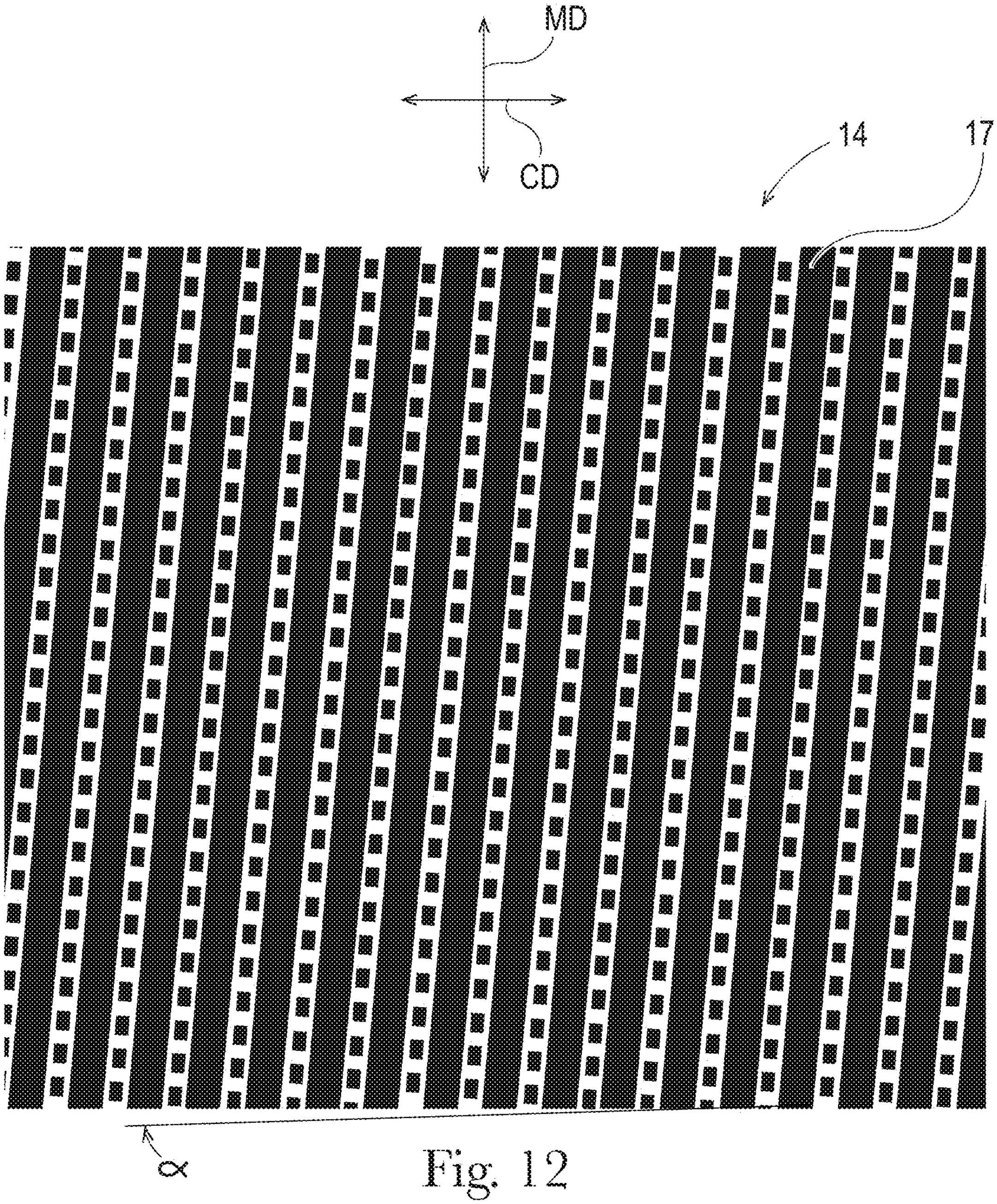
FIG. 12 is a plan view of a portion of a mask showing an alternate pattern for making of a papermaking belt of the present invention that produces a fibrous structure of the present invention.

FIG. 12 shows an example of a mask in which the portions corresponding to discrete pillows 22B are in the shape of rectangles, and, as well, the pattern is oriented at an angle alpha off of the MD-CD orientation.

In general, the papermaking belt made according to the mask disclosed herein can have a knuckle area of between about 20-50% and can be about 39%.

Papermaking Belts

The fibrous structures of the present disclosure can be made using a papermaking belt of the type described in FIG. 1, but having knuckles in the shape and pattern described herein. The papermaking belt can be thought of as a molding member. A "molding member" is a structural element having cell sizes and placement as described herein that can be used as a support for an embryonic web comprising a plurality of cellulosic fibers and/or a plurality of synthetic fibers as well as to "mold" a desired geometry of the fibrous structures during papermaking (i.e., excluding "dry" processes such as embossing). The molding member can comprise fluid-permeable areas and has the ability to impart a three-dimensional pattern of knuckles to the fibrous structure being produced thereon, and includes, without limitation, single-layer and multi-layer structures in the class of papermaking belts having UV-cured resin knuckles on a woven reinforcing member as disclosed in the above mentioned U.S. Pat. No. 6,610,173, issued to Lindsay et al. or U.S. Pat. No. 4,514,345 issued to Trokhan.

In one embodiment, the papermaking belt is a fabric crepe belt for use in a process as disclosed in the above mentioned U.S. Pat. No. 7,494,563, issued to Edwards, but having the pattern of cells, i.e., knuckles, as disclosed herein. Fabric crepe belts can be made by extruding, coating, or otherwise applying a polymer, resin, or other curable material onto a support member, such that the resulting pattern of three-dimensional features are belt knuckles with the pillow regions serving as large recessed pockets the fiber upon high impact creping in a creping nip between a backing roll and the fabric to form additional bulk in conventional wet press processes. In another embodiment, the papermaking belt can be a continuous knuckle belt of the type exemplified in FIG. 1 of U.S. Pat. No. 4,514,345 issued to Trokhan, having deflection conduits that serve as the recessed pockets of the belt shown and described in U.S. Pat. No. 7,494,563, for example in place of the fabric crepe belt shown and described therein.

In an example of a method for making fibrous structures of the present disclosure, the method can comprise the steps of:

(a) providing a fibrous furnish comprising fibers; and (b) depositing the fibrous furnish onto a molding member such that at least one fiber is deflected out-of-plane of the other fibers present on the molding member.

In still another example of a method for making a fibrous structure of the present disclosure, the method comprises the steps of:

(a) providing a fibrous furnish comprising fibers;

(b) depositing the fibrous furnish onto a foraminous member to form an embryonic fibrous web;

(c) associating the embryonic fibrous web with a papermaking belt having a pattern of knuckles as disclosed herein such that at a portion of the fibers are deflected out-of-plane of the other fibers present in the embryonic fibrous web; and (d) drying said embryonic fibrous web such that that the dried fibrous structure is formed.

In another example of a method for making the fibrous structures of the present disclosure, the method can comprise the steps of:

(a) providing a fibrous furnish comprising fibers;

(b) depositing the fibrous furnish onto a foraminous member such that an embryonic fibrous web is formed;

(c) associating the embryonic web with a papermaking belt having a pattern of knuckles as disclosed herein such that at a portion of the fibers can be formed in the substantially continuous deflection conduits;

(d) deflecting a portion of the fibers in the embryonic fibrous web into the substantially continuous deflection conduits and removing water from the embryonic web so as to form an intermediate fibrous web under such conditions that the deflection of fibers is initiated no later than the time at which the water removal through the discrete deflection cells or the substantially continuous deflection conduits is initiated; and (e) optionally, drying the intermediate fibrous web; and (f) optionally, foreshortening the intermediate fibrous web, such as by creping.

Figure 13:
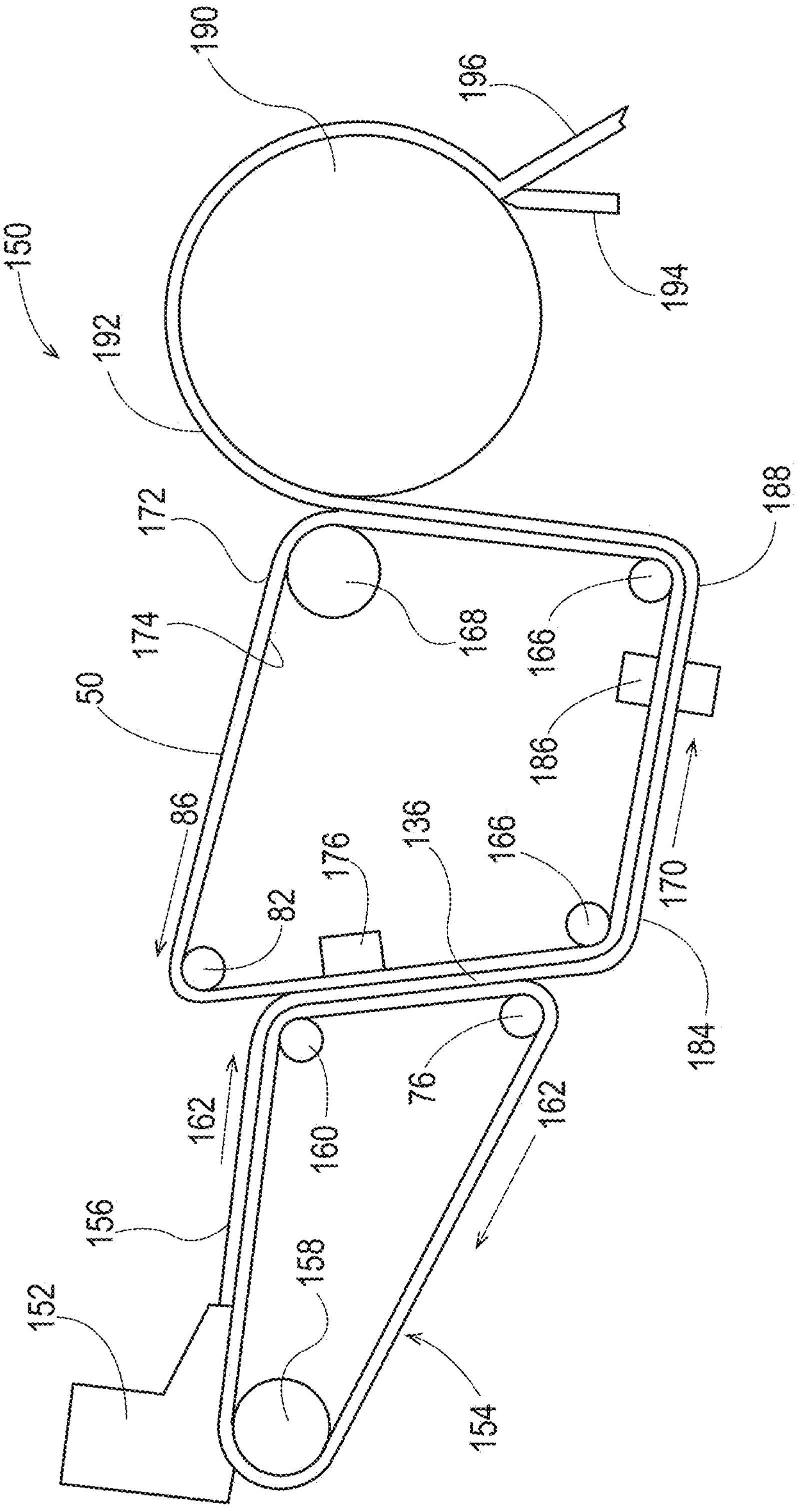
FIG. 13 is a schematic representation of one method for making a fibrous structure of the present invention.

FIG. 13 is a simplified, schematic representation of one example of a continuous fibrous structure making process and machine useful in the practice of the present disclosure. The following description of the process and machine include non-limiting examples of process parameters useful for making a fibrous structure of the present invention.

As shown in FIG. 13, process and equipment 150 for making fibrous structures according to the present disclosure comprises supplying an aqueous dispersion of fibers (a fibrous furnish) to a headbox 152 which can be of any design known to those of skill in the art. From the headbox 152, the aqueous dispersion of fibers can be delivered to a foraminous member 154, which can be a Fourdrinier wire, to produce an embryonic fibrous web 156.

The foraminous member 154 can be supported by a breast roll 158 and a plurality of return rolls 160 of which only two are illustrated. The foraminous member 154 can be propelled in the direction indicated by directional arrow 162 by a drive means, not illustrated, at a predetermined velocity, V1. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164, also referred to as a papermaking belt, in a transfer zone 136, after which the embryonic fibrous web travels on the papermaking belt 164. While in contact with the papermaking belt 164, the embryonic fibrous web 156 can be deflected, rearranged, and/or further dewatered.

The papermaking belt 164 can be in the form of an endless belt. In this simplified representation, the papermaking belt 164 passes around and about papermaking belt return rolls 166 and impression nip roll 168 and can travel in the direction indicated by directional arrow 170, at a papermaking belt velocity V2, which can be less than, equal to, or greater than, the foraminous member velocity V1. In the present invention papermaking belt velocity V2 is less than foraminous member velocity V1 such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The papermaking belts 164 of the present disclosure can be made, or partially made, according to the process described in U.S. Pat. No. 4,637,859, issued Jan. 20, 1987, to Trokhan, and having the patterns of cells as disclosed herein, and can have a pattern of the type described herein, such as the pattern shown in part in FIG. 5.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity, V4.

As discussed above, the fibrous structure can be embossed during a converting operating to produce the embossed fibrous structures of the present disclosure.

An example of fibrous structures in accordance with the present disclosure can be prepared using a papermaking machine as described above with respect to FIG. 13, and according to the method described below.

The following illustrates a non-limiting example for a preparation of a sanitary tissue product according to the present invention on a pilot-scale Fourdrinier fibrous structure making (papermaking) machine.

An aqueous slurry of eucalyptus (Fibria Brazilian bleached hardwood kraft pulp) pulp fibers is prepared at about 3% fiber by weight using a conventional repulper, then transferred to the hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.28% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The eucalyptus fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 35% of the top side is made up of the eucalyptus fibers, about 20% is made of the eucalyptus fibers on the center/bottom side and about 55% is made up of the NSK fibers in the center/bottom side. Dewatering occurs through the Fourdrinier wire and is assisted by a deflector and wire table vacuum boxes. The Fourdrinier wire is an 84M (84 by 76 5A, Albany International). The speed of the Fourdrinier wire is about 815 feet per minute (fpm).

Figure 6:
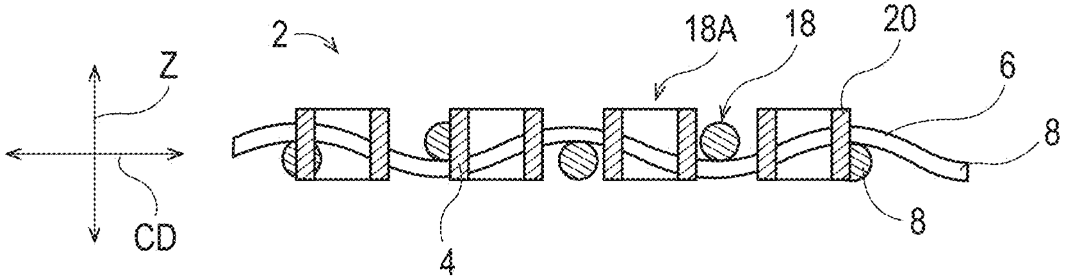
FIG. 6 is cross-sectional view of the papermaking belt of FIG. 5 taken at Section 6-6.

The embryonic wet fibrous structure is transferred from the Fourdrinier wire, at a fiber consistency of about 18-22% at the point of transfer, to a 3D patterned, semi-continuous knuckle, through-air-drying belt, a portion of which is shown in FIG. 5. The speed of the 3D patterned through-air-drying belt is about 800 feet per minute (fpm), which is 2% slower than the speed of the Fourdrinier wire. The 3D patterned through-air-drying belt is designed to yield a fibrous structure as shown in FIG. 3 comprising a pattern of semi-continuous high density knuckle regions substantially oriented in the machine direction. Each semi-continuous high density knuckle region substantially oriented in the machine direction is separated by a low density pillow region substantially oriented in the machine direction. This 3D patterned through-air-drying belt is formed by casting a layer of an impervious resin surface of semi-continuous knuckles onto a fiber mesh reinforcing member 6 similar to that shown in FIG. 5. The supporting fabric is a 98×52 filament, dual layer fine mesh. The thickness of the resin cast is about 15 mils above the supporting fabric, i.e., in the Z-direction as shown in FIG. 6. The semi-continuous knuckles and pillows can be straight, curvilinear, or partially straight or partially curvilinear.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPE® 457T20 is commercially available from GP Chemicals. The creping adhesive is delivered to the Yankee surface at a rate of about 0.10-0.20% adhesive solids based on the dry weight of the fibrous structure. The fiber consistency is increased to about 96-99% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 350° F. and a speed of about 800 fpm. The fibrous structure is wound in a roll (parent roll) using a surface driven reel drum having a surface speed of about 720 fpm.

Two parent rolls of the fibrous structure are then converted into a sanitary tissue product by loading the roll of fibrous structure into an unwind stand. The two parent rolls are converted with the low density pillow side out. The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls.

In one embodiment two plies each having three layers from a three-layer headbox are combined wire side out, with the wire-side layer containing 27% Eucalyptus, the center and fabric layer containing a mixture of 53% NSK, and 20% Eucalyptus. The sanitary tissue product is soft, flexible and absorbent and has a high substrate volume in the form of surface volume.

In one embodiment two plies each having two layers from a three-layer headbox are combined wire side out, with the wire-side layer containing 45% Eucalyptus, and the center and fabric-side layer together containing 55% NSK. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 10% Eucalyptus, and 54% NSK, and the fabric-side layer containing 36% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 5% Eucalyptus, and 52% NSK, and the fabric-side layer containing 42% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 7% Eucalyptus and 58% NSK, and the fabric-side layer containing 35% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture 22% Eucalyptus, and 53% NSK, fabric-side layer containing 25% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 51% NSK, fabric-side layer together containing 49% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 54% NSK, and fabric-side layer containing 46% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 51% NSK, and fabric-side layer together containing 49% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 55% NSK, and fabric-side layer together containing 45% Eucalyptus. The sanitary tissue product is soft, flexible and absorbent and has a high substrate volume in the form of surface volume.

The dimensions and/or values disclosed herein are not to be understood as being strictly limited to the exact numerical dimension and/or values recited. Instead, unless otherwise specified, each such dimension and/or value is intended to mean both the recited dimension and/or value and a functionally equivalent range surrounding that dimension and/or value. For example, a dimension disclosed as “40 mm” is intended to mean “about 40 mm”.

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure, comprising:

a plurality of MD-oriented elevated knuckles extending from a surface of the fibrous structure in a parallel path, wherein the plurality of MD-oriented elevated knuckles are separated in the CD by MD-oriented recessed pillows;

wherein each MD-oriented elevated knuckle comprises a plurality of discrete recessed pillows, the plurality of discrete recessed pillows are arranged in a spaced configuration along the plurality of MD-oriented elevated knuckles, such that the discrete recessed pillows are formed within side edges of the plurality of MD-oriented elevated knuckles.

2. The fibrous structure of claim 1, wherein each of the MD-oriented knuckles each have a generally equal width.

3. The fibrous structure of claim 1, wherein each of the MD-oriented pillows each have a generally equal width.

4. The fibrous structure of claim 1, wherein the discrete pillows have a circular shape.

5. The fibrous structure of claim 1, wherein one or more of the discrete pillows has a shape selected from the group consisting of circle, ellipse, oval, triangle, square, and dog-bone.

6. The fibrous structure of claim 1, wherein the fibrous structure comprises two plies.

7. The fibrous structure of claim 1, wherein the fibrous structure is embossed.

8. The fibrous structure of claim 1, wherein the fibrous structure is creped.

9. The fibrous structure of claim 1, wherein the fibrous structure is through air dried.

10. The fibrous structure of claim 1, wherein the fibrous structure is one of a paper towel or bath tissue.

11. The fibrous structure of claim 1, wherein the MD-oriented knuckles and pillows are wave-form in shape.

12. The fibrous structure of claim 1, wherein the MD-oriented knuckles and pillows are continuous.

13. A fibrous structure, comprising:

a plurality of MD-oriented pillows extending from a surface of the fibrous structure in a parallel path, wherein the plurality of MD-oriented pillows are separated in the CD by MD-oriented knuckles;

wherein each MD-oriented pillow comprises a plurality of discrete knuckles, the plurality of discrete knuckles are arranged in a spaced configuration along the plurality of MD-oriented pillows, such that the discrete knuckles are formed within side edges of the plurality of MD-oriented pillows; and wherein the discrete knuckles differ in size and are the same shape.

14. The fibrous structure of claim 13, wherein each of the MD-oriented pillows each have a generally equal width.

15. The fibrous structure of claim 13, wherein each of the MD-oriented knuckles each have a generally equal width.

16. The fibrous structure of claim 13, wherein the discrete knuckles have a circular shape.

17. The fibrous structure of claim 13, wherein one or more of the discrete knuckles has a shape selected from the group consisting of circle, ellipse, oval, triangle, square, and dog-bone.

18. The fibrous structure of claim 13, wherein the fibrous structure comprises two plies.

19. The fibrous structure of claim 13, wherein the fibrous structure is embossed.

20. The fibrous structure of claim 13, wherein the fibrous structure is creped.

21. The fibrous structure of claim 13, wherein the fibrous structure is through air dried.

22. The fibrous structure of claim 13, wherein the fibrous structure is one of a paper towel or bath tissue.

23. The fibrous structure of claim 13, wherein the MD-oriented knuckles and pillows are wave-form in shape.

24. The fibrous structure of claim 13, wherein the MD-oriented knuckles and pillows are continuous.

* * * * *